Dec. 4, 1951

S. HINDS ET AL 2,577,682

AIRPORT FUELING MECHANISM

Filed Aug. 17, 1946

11 Sheets-Sheet 1

INVENTORS
Sherwood Hinds,
BY J. Gordon Dahlem,
Wilkinson, Huxley,
Byrne & Knight attys.

Dec. 4, 1951 S. HINDS ET AL 2,577,682

AIRPORT FUELING MECHANISM

Filed Aug. 17, 1946 11 Sheets-Sheet 2

INVENTORS.
Sherwood Hinds,
J. Gordon Dahlen
BY Atkinson, Hughes,
Byron & Knight
Attys

AIRPORT FUELING MECHANISM

Filed Aug. 17, 1946 11 Sheets-Sheet 3

INVENTORS.
Sherwood Hinds
J. Gordon Dahlem,
BY Wilkinson, Huxley, Byron & Knight
attys

AIRPORT FUELING MECHANISM

INVENTORS.
Sherwood Hinds,
J. Gordon Dahlem,
BY Wilkinson, Huxley, Byron & Knight
Attys.

AIRPORT FUELING MECHANISM

Filed Aug. 17, 1946 11 Sheets-Sheet 5

INVENTORS.
Sherwood Hinds,
J. Gordon Dahlem,
BY Wilkinson, Huxley, Byron & Knight
attys.

INVENTORS.
Sherwood Hinds,
J. Gordon Dahlem,
BY Wilkinson, Huxley,
Byrne & Knight Attys.

INVENTORS.
Sherwood Hinds,
J. Gordon Dahlem,
BY Wilkinson, Huxley, Byron & Knight
Attys.

INVENTORS
Sherwood Hinds,
BY J. Gordon Dahlem,
Atkinson, Hurley,
Byron & Knight Attys.

AIRPORT FUELING MECHANISM

INVENTOR.
Sherwood Hinds,
BY J. Gordon Dahlem,
Dickinson, Huxley, Byron & Knight attys.

INVENTORS.
Sherwood Hinds.
BY J. Gordon Dahlem
Atkinson, Huxley, Byron & Knight Attys.

AIRPORT FUELING MECHANISM

Filed Aug. 17, 1946 11 Sheets-Sheet 11

INVENTORS.
Sherwood Hinds,
BY J. Gordon Dahlem,
Wilkinson, Huxley,
Byron & Knight Attys.

Patented Dec. 4, 1951

2,577,682

UNITED STATES PATENT OFFICE 2,577,682

AIRPORT FUELING MECHANISM

Sherwood Hinds, Columbia City, and J. Gordon Dahlem, Fort Wayne, Ind., assignors to The Wayne Pump Company, Fort Wayne, Ind., a corporation of Maryland Application August 17, 1946, Serial No. 691,212

13 Claims. (Cl. 222—23)

This invention relates to liquid dispensing apparatus, and more particularly to a fuel dispensing device which permits high speed delivery of fuel at a relatively low pressure through a flexible, collapsible hose which may be easily handled and controlled during and between dispensing operations. These characteristics make the system readily adaptable as an aircraft fueling device.

Because of its novel construction the system contemplated herein may be used with any of the commonly used sources of fuel supply. If a remote, stationary storage tank is utilized, the dispensing apparatus may then be disposed in a pit, cabinet, or similar housing. If a mobile source of fuel supply is used, the dispensing mechanism may then be mounted on a vehicle, which may be equipped with a power take-off to operate the dispensing apparatus. Or a mobile storage vehicle may be used for the mechanism, in which case the mechanism is connected to selected fuel outlets. This adaptability is significant since the commercial airlines, which have the problem of rapidly fueling large planes having a very large fuel carrying capacity, have preferred to use mobile sources of supply, whereas the so-called fueling pit system has been widely used in installations designed to service planes of smaller size than the commercial transports. The desirability of fueling military planes rapidly and easily is, of course, obvious.

It is also desirable to employ a fueling system that can be readily operated by a single attendant, which is feasible only when the system can be controlled from the nozzle end of the dispensing hose. In addition, a hose that can be easily handled is necessary, since a considerable amount of movement from one fueling point to another is required when fueling the larger planes. This problem is overcome in the system herein disclosed by normally maintaining the hose in a collapsed, exhausted condition when fuel is not being dispensed, the fuel being withdrawn from the hose after each dispensing operation, if desired.

The hose, therefore, can be easily handled and stored, even though it has a relatively large diameter. This feature also makes the system readily adaptable to the method of fueling from the lower surface of the wing of the plane, since the hose is put in a dry condition before being detached from the fuel intake point.

The measurement of the amount of fuel actually dispensed by such a system as herein disclosed is complicated by the fact that, in effect, a combination wet and dry hose system is used, since the dispensing hose must be filled with liquid before dispensing is begun, and the liquid remaining in the hose after dispensing is stopped is pumped back out of the hose and returned to the source of supply. The present system, therefore, includes a meter operated by the flow of liquid as it is pumped, and a register adapted to be operated by that meter only when liquid is actually being dispensed.

It is, therefore, an object of this invention to provide a fueling apparatus enabling the high speed delivery of fuel at a relatively low pressure.

It is a further object to provide a fueling apparatus wherein the dispensing hose is normalyl in a collapsed, exhausted condition when fuel is not being dispensed, and can therefore be stored in dry condition.

It is a further object to provide a fueling apparatus in which the dispensing and the evacuating operations are both controllable at the nozzle end of the dispensing hose.

It is a further object to provide a fueling apparatus which may be easily and efficiently operated by only one attendant.

It is a further object to provide a fueling apparatus which registers only the amount of liquid dispensed even though liquid is pumped into and back out of the dispensing hose before and after a dispensing operation.

It is a further object of the invention to provide a fueling apparatus which is compact, complete and simple, and easy to use.

It is a further object of the invention to provide an apparatus which can be adapted to the several methods of fueling now in use.

It is a further object of the invention to provide an apparatus which will reduce the hazards incident to fueling aircraft by reducing the amount of gasoline stored in hoses at the airport or in the fueling pit.

It is a further object of the invention to provide an apparatus which will further reduce the hazards incident to fueling aircraft by making it necessary to bond together electrically all of the elements of the system and to ground the vehicle to be fueled before one attendant can dispense fuel.

It is a further object of the invention to provide an apparatus which has certain elements, subject to failure, so arranged that such failure will result in evacuation of the hose.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figures 1, 1A, 2:
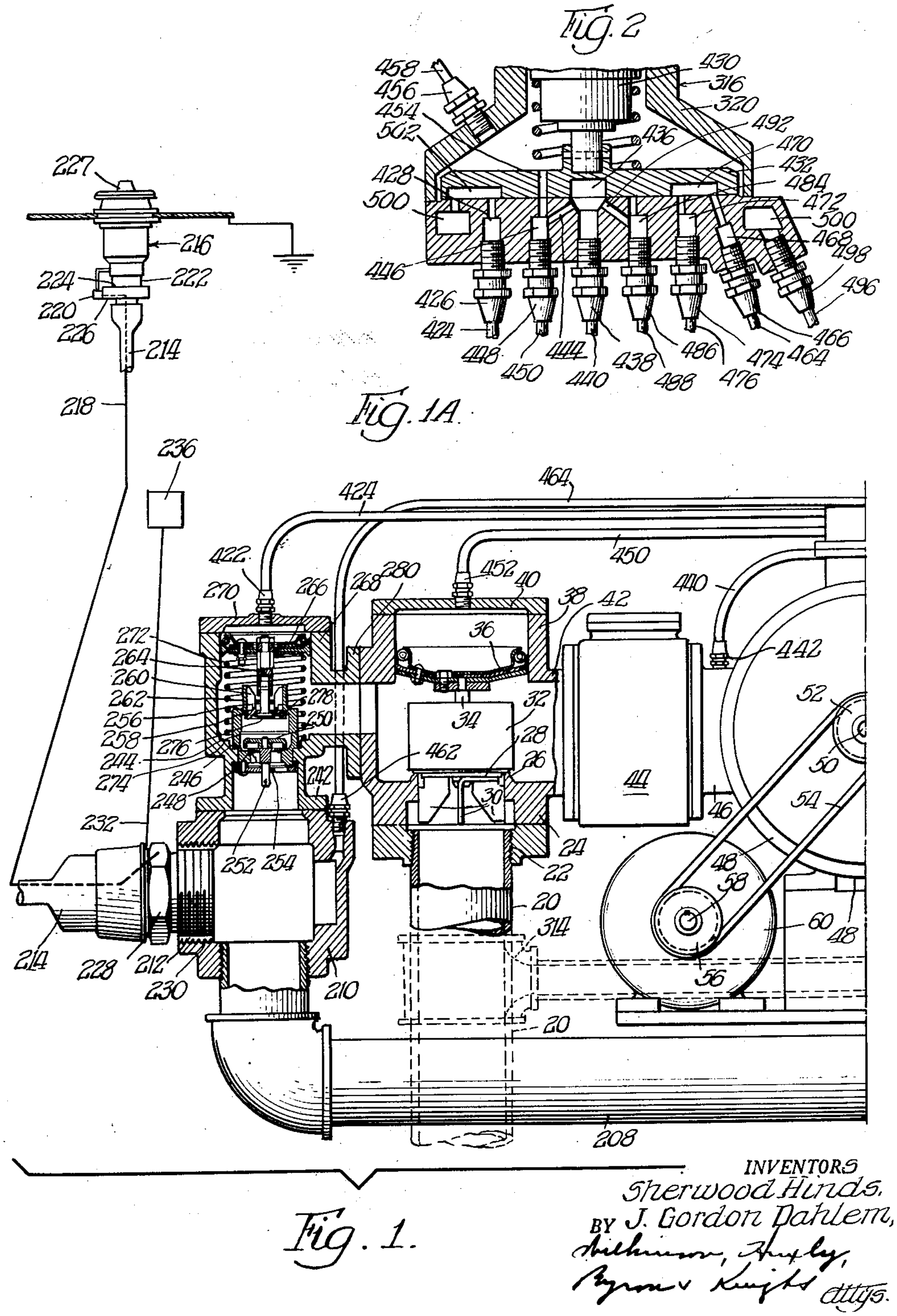
Figure 1 (composed of Figures 1A and 1B) is a developed view, partly in section, of filling mechanism embodying the invention showing the control valve in position for discharge or fueling.
Figure 2 is a fragmentary elevation of the valve shown in Figure 1, showing the valve in position for defueling.

Referring, more particularly, to Figure 1, the system contemplated herein includes the suction line 20 adapted to be connected to a suitable source of liquid supply (not shown) either directly, as where the system is disposed in a cabinet, pit, housing or the like, or through a hose as where the mechanism is mounted on a vehicle such as is shown and described in application Serial No. 612,233, filed August 23, 1945, now Patent No. 2,556,425, issued June 12, 1951.

The suction line 20 is connected as at 22 to the inlet side of the inlet or tank suction valve housing 24, said housing having a seat 26 adapted to be closed by the valve member 28. The valve member 28 is provided with the guiding fins 30 so disposed that when the valve is in open position the flow is not restricted, yet the valve is guided toward fully seated position thereby. A weight 32 is provided on said valve urging the valve toward closed position by gravity, though of course a spring could be used in place of said weight. The weight is provided with the stem or piston rod 34 having the piston 36 secured thereto, said piston being reciprocally mounted in the cylinder 38, the upper end of said cylinder being closed by means of the cover 40. The valve 28 is a pressure operated control means for controlling the flow of liquid out of the inlet flow line or suction line 20 into the liquid forcing means or pump 48.

The valve housing 24 is connected as at 42 to the strainer 44, the other side of the strainer being connected as at 46 to the inlet or suction side of the pump 48. The pump may be of any suitable type, such as that shown in United States Letters Patent No. 2,384,172, granted September 4, 1945 to Robert J. Jauch and Sherwood Hinds.

Figure 3:
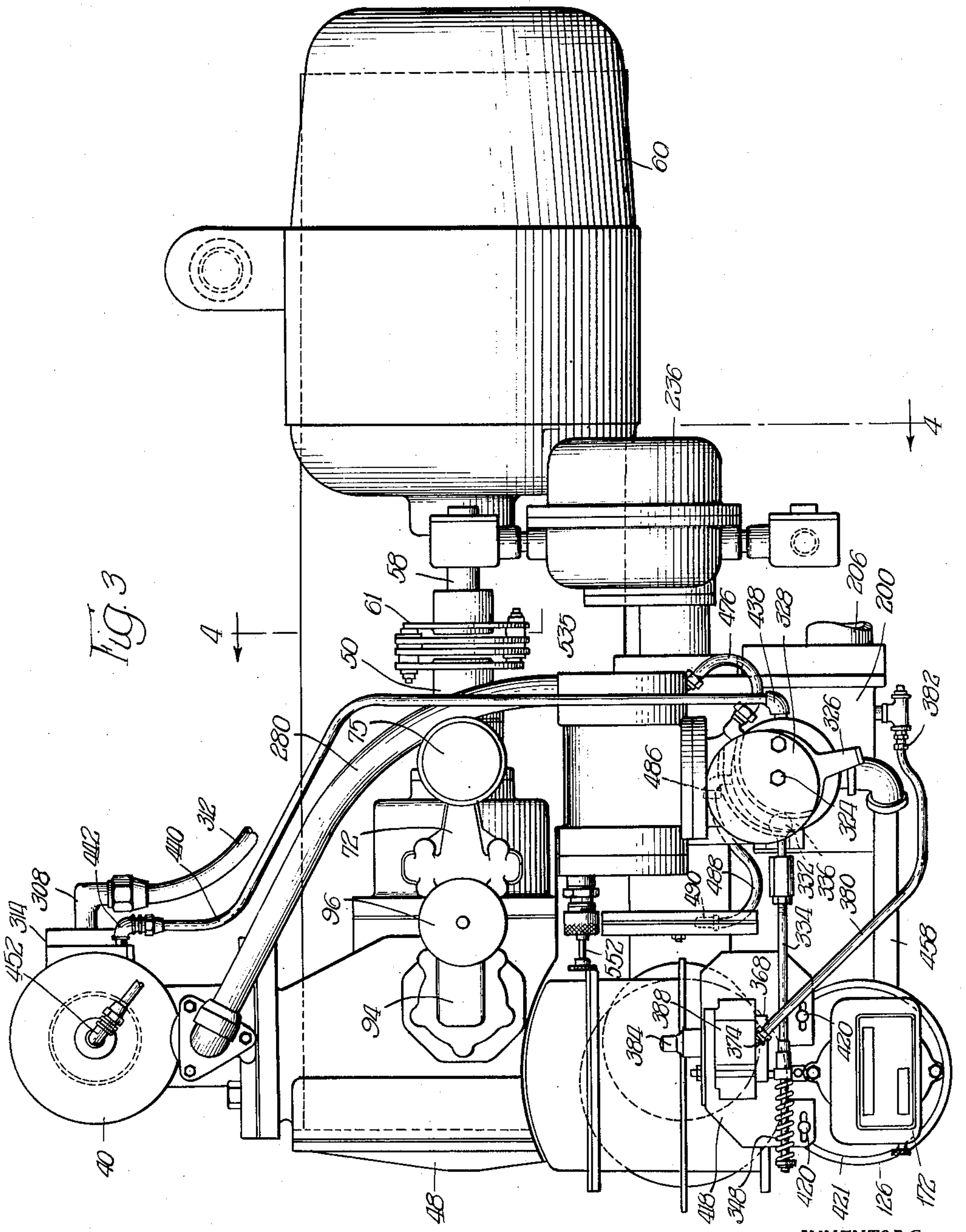
Figure 3 is a top plan view of the same general type of filling mechanism illustrated in Figure 1.

The pump (Figures 1, 3, 4 and 8) is provided with propeller shaft 50 having the pulley 52 (Figure 1) thereon adapted to be rotated by the belt 54 which also passes over a pulley 56 provided on the drive shaft 58 of the motor or other actuating means 60. The belt and pulley is shown in the developed view in Figure 1, but the drive shaft 58 of motor 60 may be directly coupled as at 61 (Figure 3) to propeller shaft 50 of the pump. The pump (Figure 3) consists essentially of a casing 62 having an impeller chamber 64 in which the impeller 66 is rotatably mounted, being rotated by shaft 50, said shaft also reciprocating the piston 68 of the vacuumizing cylinder 70.

Cylinder 70 is provided with the cylinder head 72 having exhaust passage 74 communicating with atmosphere through muffler 75, passage 74 communicating with cylinder 70 through exhaust valve 76, and cylinder 70 above the piston 68 communicating with inlet passage 78 through inlet valve 80. The passage 78 is connected through a tube 82 to valve fitting 84 disposed in the dome 85 of air separator chamber 86 of the pump. The air separator chamber 86 is provided with the float 88 connected to one end of a suitably pivoted lever 90. The valve 92 controls the passage 93 which extends through fitting 84 and communicates with tube 82. It will be seen that when the float is at a predetermined raised position due to liquid in chamber 86, valve 92 will be closed to prevent the action of the piston in vacuumizing cylinder 70 from drawing liquid from the chamber 86.

The closure 94, defining dome 85, is provided with the diaphragm assembly indicated generally at 96, said assembly being for the purpose of limiting the amount of vacuum which the vacuumizing cylinder and its piston can create in the chamber 86.

The assembly 96 consists of the housing 98 secured as at 100 to the fitting 102 which in turn is secured as at 104 to the closure 94. Housing 98 is provided with the cap 106 fixed thereto and vented to atmosphere as at 108, a diaphragm 110 being secured between the cap 106 and the housing 98. Diaphragm 110 is provided with the plunger rod 112 secured to said diaphragm and having a threaded adjustment portion 114, the rod 112 extending through fitting 102 and being provided with an adjustable end 116 contacting the valve 92. A spring seat 118 is provided on said rod adjusted by means of the nuts 120, the upper end of spring 122 being seated on said spring seat 118 and the lower end being seated on the spring seat provided by the fitting 102. It will thus be seen that the assembly 96 can be adjusted as at 120 and 116 so that when a predetermined vacuum is pulled by the vacuumizing cylinder 70, the diaphragm 110 will be moved downwardly, as viewed in Figure 8, against the spring 122 to throttle or close the valve 92, thus controlling the amount of vacuum pulled in the chamber 86. It is understood that the seat between the rod 112 and its passage through the fitting 102 is loose enough to permit vacuum action upon the underside of the diaphragm 110.

Figure 9:
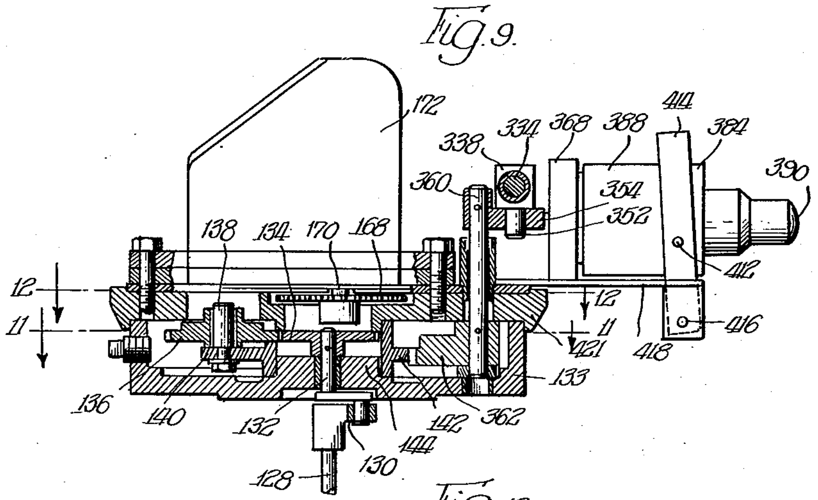
Figure 9 is a fragmentary sectional elevation of the registering mechanism and intermediate gearing for permitting operation of the register under predetermined conditions.

The outlet side of the pump 48 is connected as at 124 (Figure 1B) to the inlet side of the meter 126, said meter being provided with the meter shaft 128 (Figure 9) connected through a driving connection 130 to shaft 132. Shaft 132 extends into the gear casing 133 and is provided with the gear 134 which meshes with idler gear 136 which is pivoted as at 138 to the arm 140 of segment 142 which is pivotally mounted on the boss 144, the axis of segment 142 being co-axial with that of shaft 132.

Figure 13:
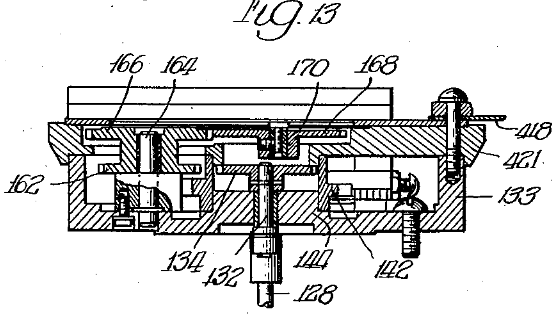
Figure 13 is a sectional elevation taken substantially in the plane as indicated by the line 13—13 of Figure 12.
Figure 10:
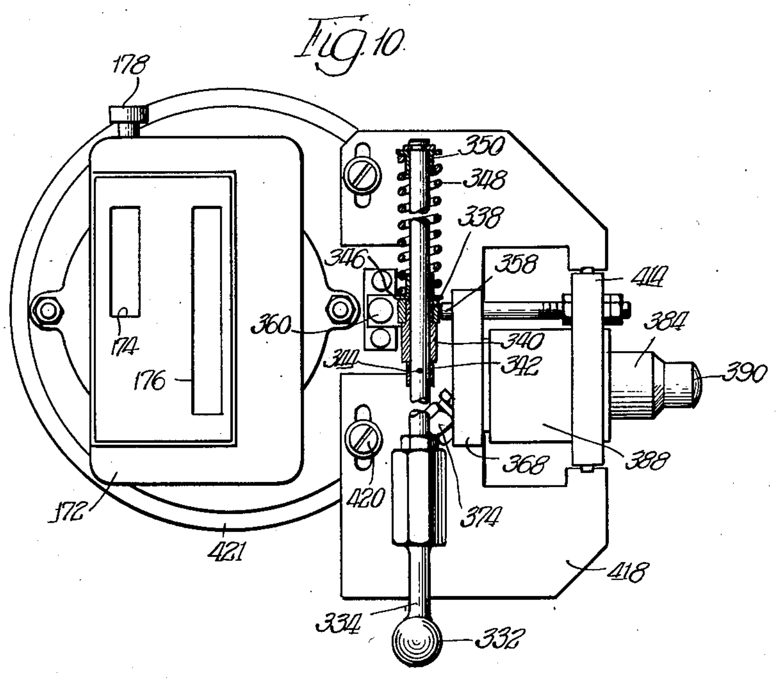
Figure 10 is a top plan view of the register illustrated in Figure 9.

The arm 140 is provided with the shoulder 146 (Figure 11) which is adapted to be engaged by the lug 148 provided on the pawl 150. Pawl 150 is pivoted as at 152 and is provided with the spring 154, one end of which is connected to the lug 156 of pawl 150, the other end being connected to the stationary limiting post 158 disposed in slot 160 of pawl 150, the spring being so disposed that the lug 148 is urged to contact shoulder 146. Gear 162 is pivoted as at 164 and is provided with gear 166 (Figures 12 and 13) rotatable with gear 162 and meshing with gear 168 which is disposed on the drive shaft 170 of the register 172. Thus when gears 136 and 162 are in mesh, and the meter shaft is operated by the passage of liquid through the meter, the amount of liquid passing through the meter will be shown by suitable indicating means of the register 172 (Figure 10).

Register 172 is provided with a resettable indicator 174 and a totalizer 176, so that indicator 174 is adapted to indicate the liquid passing through the meter for any particular service and may be zeroized by the reset knob 178. In order to prevent the totalizer 176 from being zeroized, or moved to an inaccurate position in the event zeroizing takes place when gears 136 and 162 are not in mesh, pawl 150 is provided with a locking lug 180 (Figures 11 and 12) which is adapted to engage gear 162 when gear 136 is moved out of mesh therewith, it being understood, of course, that the locking lug 180 is inoperative when gears 136 and 162 are in mesh.

The outlet side of the meter 126 (Figure 1B) is connected to the hose valve housing 182 which is provided with the valve seat 184 on which the valve 186 is adapted to be seated, said valve being urged toward closed position by means of the spring 188. Preferably a long spring 188 is used so that the tension of the spring does not materially change during the operation of the valve. A stop 190 is provided in alignment with the valve stop 192 for limiting the open position of the valve, and the valve is provided with the guiding fins 194 functioning in a manner similar to the fins 30 of valve 28 (Figure 1A). The valve 186 is provided with the valve stem or piston rod 196 extending downwardly and provided with the piston 198 reciprocally mounted in the cylinder 200 which is closed by means of the cap 202.

The valve 186 is a pressure operated control means for controlling the flow of liquid into the dispensing flow line and the housing 182 is provided with the outlet 204 connected to the piping 206 which is connected through piping 208 to the outlet housing 210, said housing being provided with the outlet 212 connected to the discharge hose 214 or to a hose reel or other controlling means for a discharge hose, the said hose being preferably a flexible, collapsible discharge hose such as is shown in Patent No. 2,362,559, granted November 14, 1944, to Jauch and Sturm, the hose being provided with a suitable control nozzle, such as the usual hand nozzle or an under-wing type of connector, such as shown in application Serial No. 655,953, Dahlem, filed March 21, 1946 for Hose Fitting Mechanism, now Patent No. 2,461,312, issued February 8, 1949.

Where the hose is provided with the nozzle end control such as shown in detail in said application Serial No. 655,953 and as at 216 (Figure 1A), one end of the static wire 218 in the hose is connected to one side of the switch 220, the other side of the switch being grounded to the inner coupling member 222 as at 224, the switch member 220 being insulated from the nozzle end as at 226. The hose coupling 216 is adapted to be coupled to the tank coupling 227 of the vehicle to be fueled, as shown in detail in said last referred to application. The other end of the static wire 218 is connected to the fitting 228 which is insulated from the valve housing 210 by the insulating sleeve or bushing 230, and said fitting 228 is connected as through the conductor 232 to the control line 234 (Figures 17 and 18) which extends into the switch box 236 for connection to the binding post 238 of the control panel 240, to be hereinafter more particularly described.

The housing 210 (Figure 1A) is connected to the hose suction valve housing 242 which is provided with the cage 244 seated in said housing as at 246 and provided with the valve seat 248 for the valve disk 250, the valve disk being provided with the depending stem 252 guided by the spider 254 secured to the cage 244. The cage is also provided with valve seat 256 on which the valve disk 258 is adapted to seat, said disk 258 being provided with the finned valve stem 260 guided by the guide 262 provided on cage 244. Piston rod 264 of piston 266 has a hollow end and said piston is adapted to reciprocate in cylinder 268 of the housing 242, the top of said cylinder being closed by means of the cap 270. This valve assembly is a pressure operated control means for controlling the flow of liquid out of the dispensing flow line at the inlet end of said line.

Spring 272 is interposed between the piston 266 and the spring seat 274 urging the piston upwardly to close valve 258 and to close hose suction valve 276 on valve seat 278 provided on valve 258. The valve stem of valve 276 is received in the hollow end of piston rod 264 and is pinned thereto. It will be seen that a slight lost motion is provided between the end of piston rod 264 and of valve 258. Housing 242 is connected as at 280 to housing 24, whereby the underside of piston 266 communicates with the chamber in housing 24 between piston 36 and valve 28. The connection 280 is shown as a short connection in the developed view Figure 1A but is shown in proportion in Figures 3 and 4.

Hose valve housing 182 (Figure 1B) is connected as at 282 to the return valve housing 284 in which the stop 190 is adjustably mounted and provides a spring seat for the upper end of spring 188. The housing 284 is provided with the valve seat 286 on which the valve 288 is adapted to be seated, said valve being urged toward closed position by means of the spring 290 interposed between the spring seat 292 of cap 294 and the piston 296 connected to the valve 288 by means of the piston rod 298. The piston 296 reciprocates in cylinder 299, which is closed by cap 294, and cap 294 is provided with the valve guide 300 for the extension 302 of piston rod 298. Valve 288 controls the flow to the manifold 304 which in turn is connected as at 306 to the piping 308 which may be directly connected as at 310 to the source of liquid supply, or may be connected as by piping 312 (Figures 1, 3 and 4) to the suction pipe 20 as at 314 (Figure 1A). The valve 288 is a pressure operated control means for diverting the flow of the liquid at the outlet side of the liquid forcing means into the inlet flow line.

The control valve indicated generally at 316 (Figures 1, 2, 4 and 7) for controlling fueling and defueling comprises the valve body 318 and the valve cap 320 closed as by closure 322. The operating shaft 324 extends through the cap and is provided with the operating lever or handle 326 provided for manual operation of control valve 316 when desired. The shaft 324 is provided with the cam 328, said cam being connected at 330 to the rounded end 332 (Figures 3, 5 and 10) of the clutch rod 334. The connection 330 with the rounded end 332 of the clutch rod is caused to move in the cam passage 336 (Figure 3), the passage being so shaped that at the extreme positions of the clutch rod 334, i. e., in fully clutched or declutched positions, the rounded end 332 is locked into position, i. e., there cannot be an accidental slippage between the cam and clutch rod.

The rod 334 is provided with the block 338 (Figures 9, 10 and 11) said block being mounted on the bushing 340 which is slidably mounted on the rod 334. A collar 342 is pinned as at 344 to the rod, whereby movement of the collar 342 against the bushing 340 moves said bushing. The block is provided with a spring seat 346 for one end of the spring 348, the other end of the spring being seated on the seat 350 secured to the rod 334. Block 338 is pivoted as at 352 (Figures 9 and 11) to the latch lever 354, said lever being provided with the locking shoulder 356 adapted to engage the stop pin 358. The lever 354 is secured to the shaft 360 which extends downwardly into the casing 133 and is provided with the segment 362 meshing with the segment 142 whereby movement of segment 362 moves segment 142.

Figure 15:
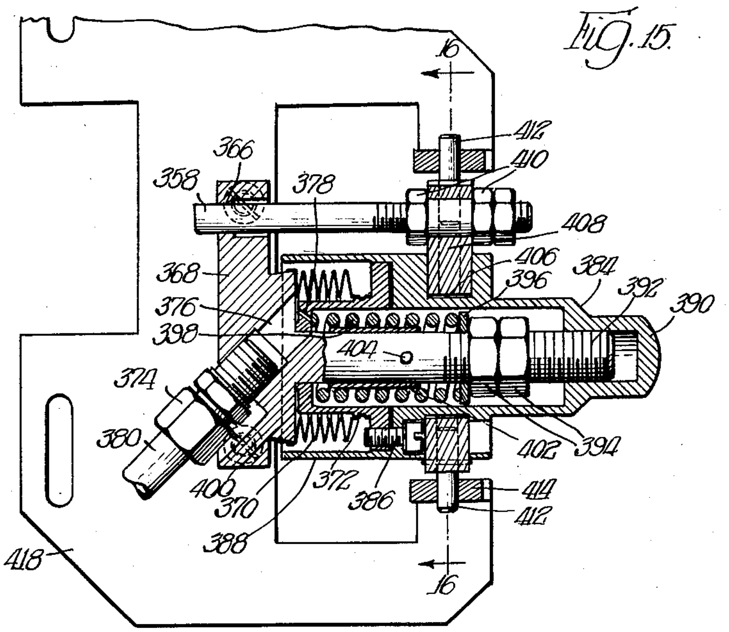
Figure 15 is a sectional plan of the bellows mechanism embodying the invention, the same being taken substantially in the plane as indicated by the line 15—15 of Figure 14.

Stop 358 (Figures 10, 11 and 15) extends through a suitable guide 366, the guide being provided with a Sylphon or flexible bellows supporting bracket 368, said bracket being provided with the Sylphon or flexible bellows 370 closed at one end by the bracket 368 and at the other end by housing 372. Bracket 368 is provided with the fitting 374 communicating through passages 376 and 378 with the inside of housing 372, said fitting being connected through tube 380 (Figures 3 and 15) with the fitting 382 which communicates with cylinder 200 below the valve 186.

Figure 14:
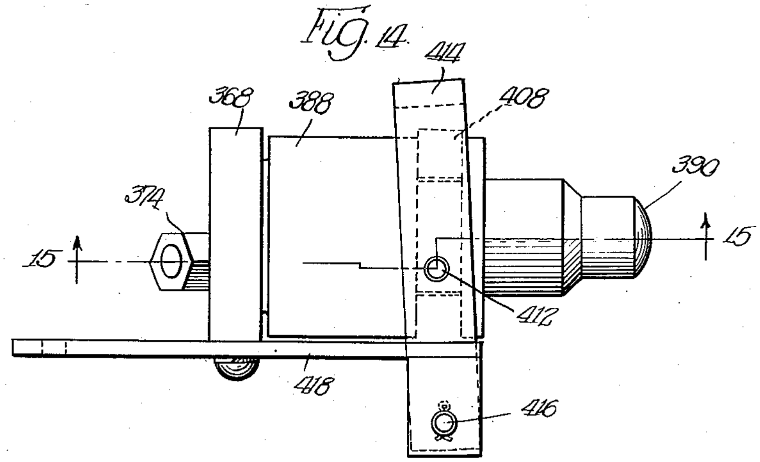
Figure 14 is a side elevation of the resilient bellows carrier mechanism for rendering the register mechanism operative after a predetermined pressure has been built up in the discharge line.
Figure 16:
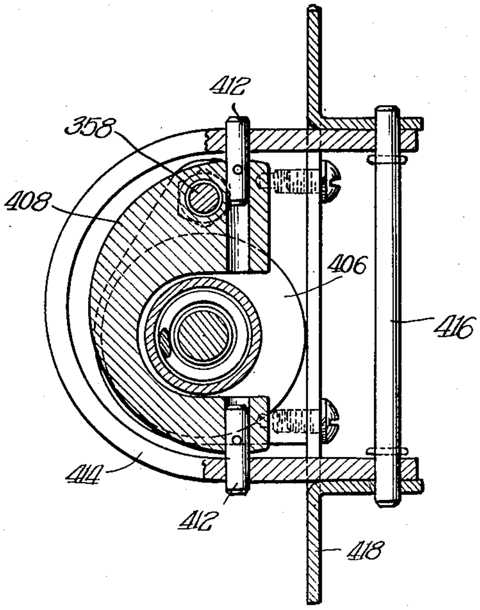
Figure 16 is a sectional elevation taken substantially in the plane as indicated by the line 16—16 of Figure 15.

Cover 384 is connected as at 386 to the housing 372 and is provided with the shroud 388 surrounding the Sylphon and is also provided with a closed end 390 for the reception of one end of the bolt 392 provided on the bracket 368. Nuts 394 (Fig. 15) adjustably position the spring seat 396 on the bolt 392, spring 398 being seated at one end on said seat and at the other end on the seat 400 provided on the housing 372. A sleeve 402 is pinned as at 404 to the bolt 392 and limits the movement of the Sylphon when it expands. Cover 384 is provided with the groove or recess 406 for the reception of the U-shaped yoke 408 (Figures 15 and 16), said yoke being provided with the stop pin 358 adjustable thereon as at 410, said yoke being provided with pins 412 pivoted to the yoke 414 which in turn is pivoted by rod 416 (Figures 14 and 16) to the Sylphon support 418 which in turn is secured as at 420 (Figures 3 and 10) to the housing 421 of the casing 133.

Cap 270 (Figure 1A) is provided with the fitting 422 which is connected through tube 424 to the fitting 426, communicating with passage 428 in valve body 318. Shaft 324 is provided with the seal 430 for preventing leakage from the cap 320, and said shaft is provided with the valve disk 432 having a passage 434 adapted to connect passage 428 with passage 436. Passage 436 communicates through fitting 438, tube 440 and fitting 442 to the pump suction.

Figures 1, 1B:
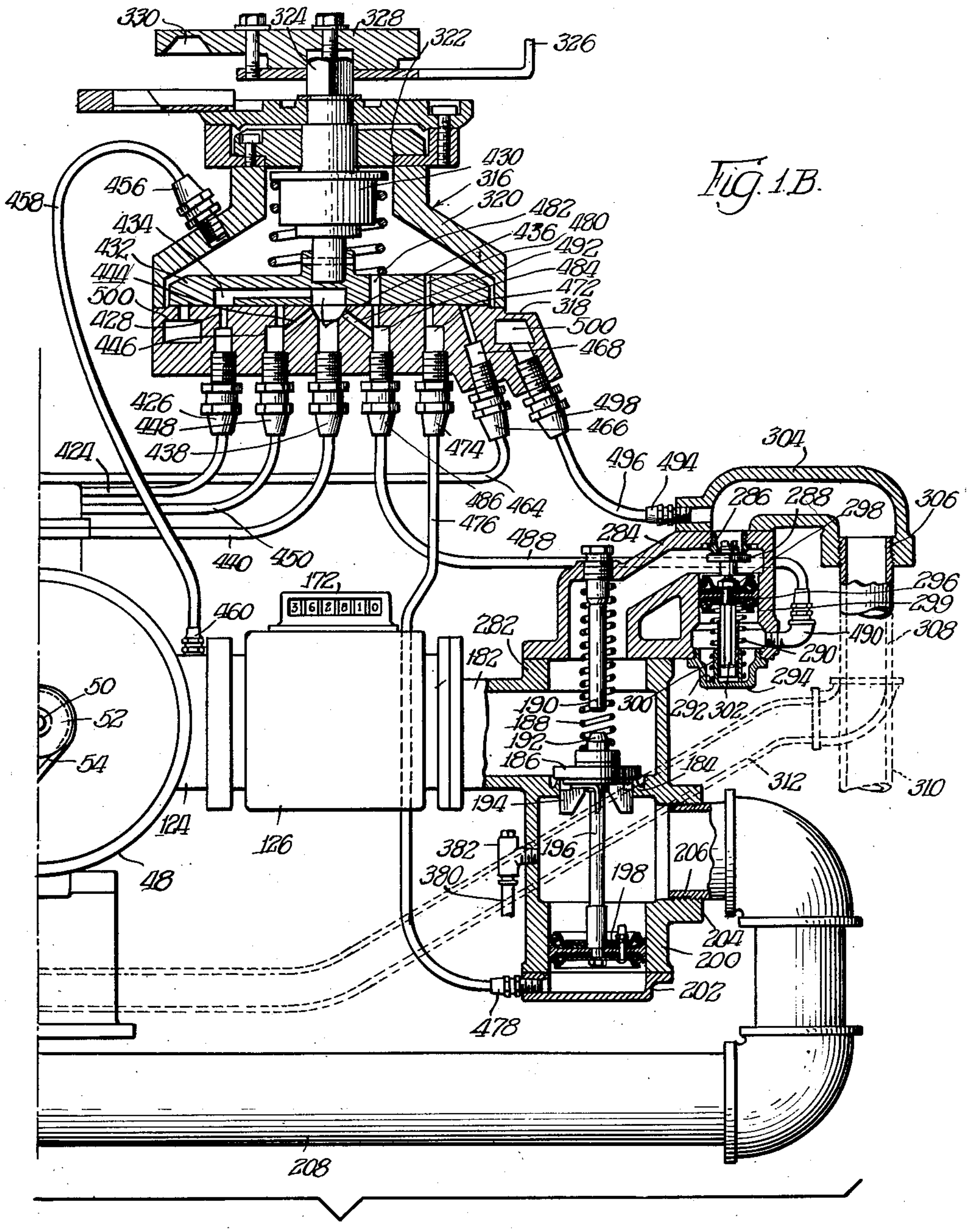

Passage 436 communicates through passages 444 and 446 through fitting 448, tube 450, and fitting 452 provided in valve cap 40 to cylinder 38 above the piston 36. Passage 446 which is closed by the valve disk when the mechanism is in the position as shown in Figure 1B, (i. e., when serving through the hose) is adapted to be connected with passage 454 (Figure 2) provided in the disk 432. When the valve is inoperative, i. e., as shown in Figure 2, the passage 446 communicates with the valve cap 320 through passage 454. Fitting 456 (Figures 1 and 2) communicates with the inside of cap 320 and is connected through tube 458 (Figures 1B, 3 and 5) and fitting 460 to the pump outlet.

Outlet housing 210 is provided with the fitting 462 connected to tube 464 which is connected through fitting 466 to passage 468 which is closed by the valve disk when the valve is in serve position as shown in Figure 1B. Passage 468 is adapted to be connected with passage 470 of the valve disk 432 when the valve is in inoperative position (Figure 2) at which time passage 470 communicates with passage 472 in the valve housing which in turn communicates through fitting 474, tube 476 and fitting 478 with cap 202 of cylinder 200 below the piston 198.

When the valve is in serve position as shown in Figure 1B, passage 472 communicates with the inside of cap 320 through passage 480 provided in the valve disk. When the valve is in serve position as shown in Figure 1B, the inside of cap 320 communicates through passage 482 provided in the valve disk with passage 484 in the valve body which in turn communicates through fitting 486, tube 488 and fitting 490 with the cylinder 299 below said piston 296. Passage 484 also communicates through passage 492 with passage 436. The manifold 304 is provided with fitting 494 communicating through tube 496 and fitting 498 with passage 500 in the valve body, said passage being closed when the valve is in serve position, as shown in Figure 1B, but when the valve is inoperative position (Figure 2), passage 500 communicates through passage 502, provided in the valve disk 432, with passage 428 and tube 424.

Figure 4:
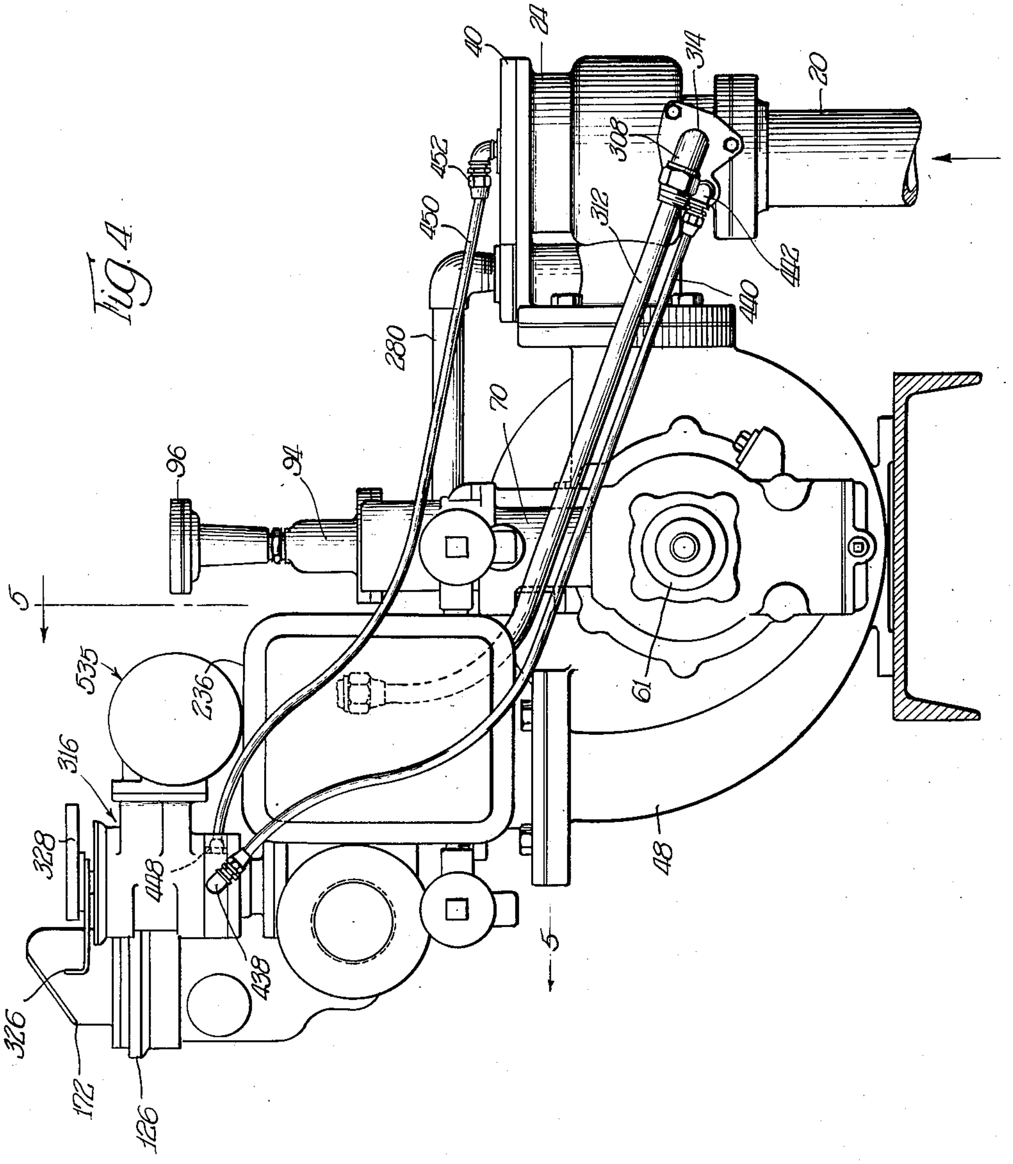
Figure 4 is an end elevation, partly in section, of a portion of the filling mechanism embodying the invention, the same being taken substantially in the plane as indicated by the line 4—4 of Figure 3.
Figures 5, 7:
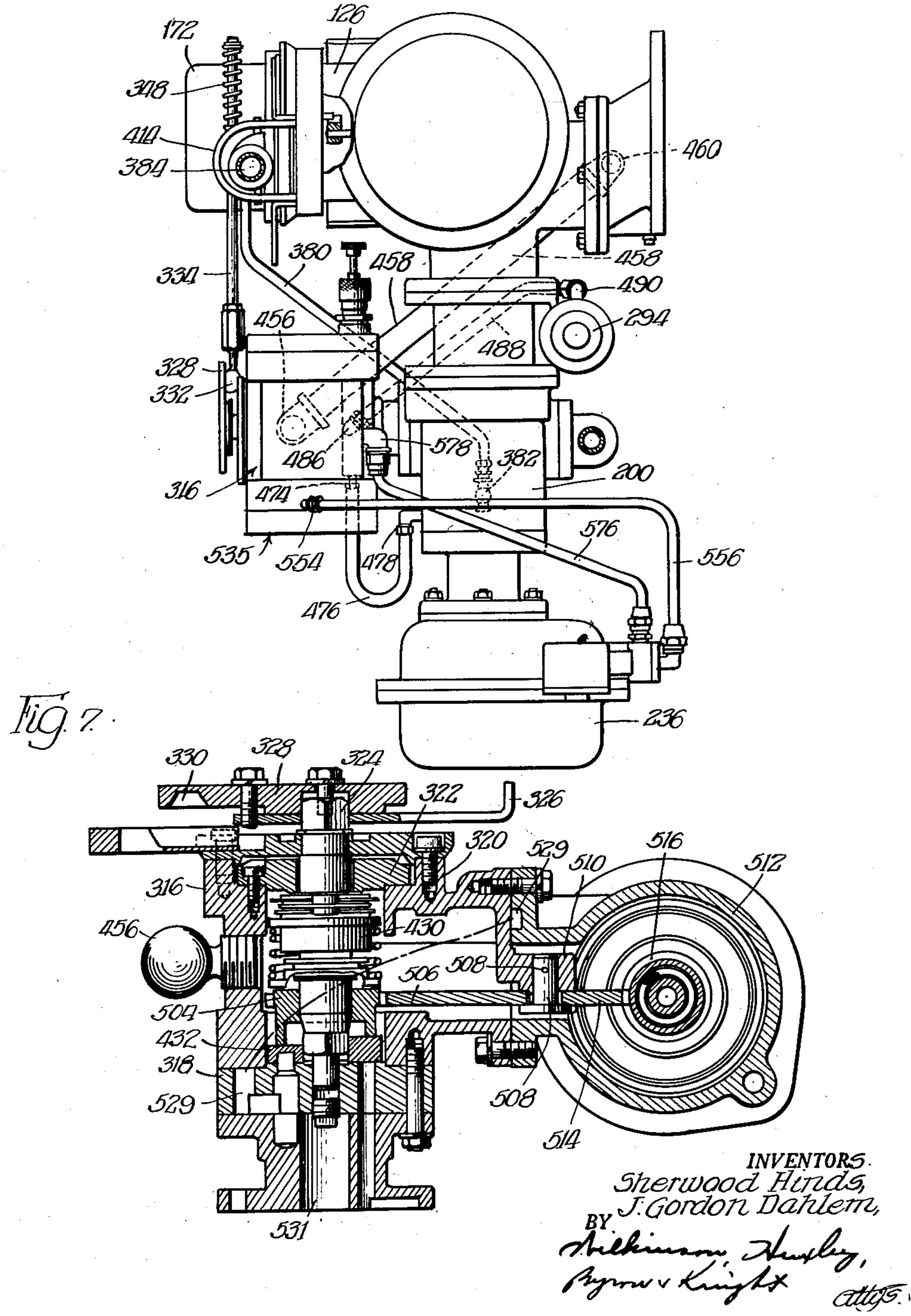
Figure 5 is a fragmentary elevation of a portion of the counter control and filling mechanism, said portion being within the dot and dash lines of Figure 4 and looking in the direction of the arrows 5—5.
Figure 7 is a sectional elevation of a portion of the piston valve assembly illustrated in Figure 6.
Figure 6:
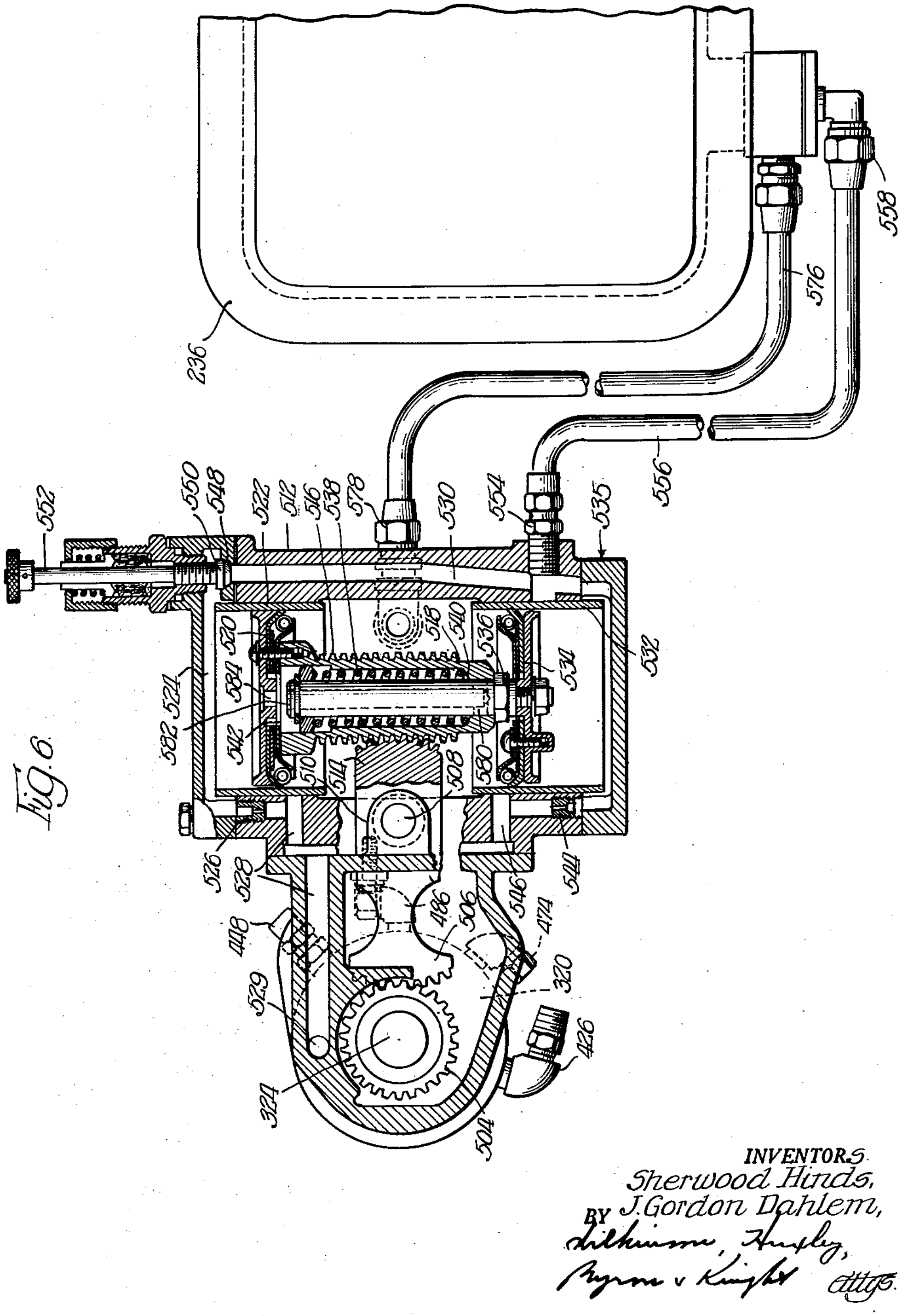
Figure 6 is an enlarged fragmentary sectional plan of the piston valve assembly for automatically or manually controlling the filling mechanism.
Figure 8:
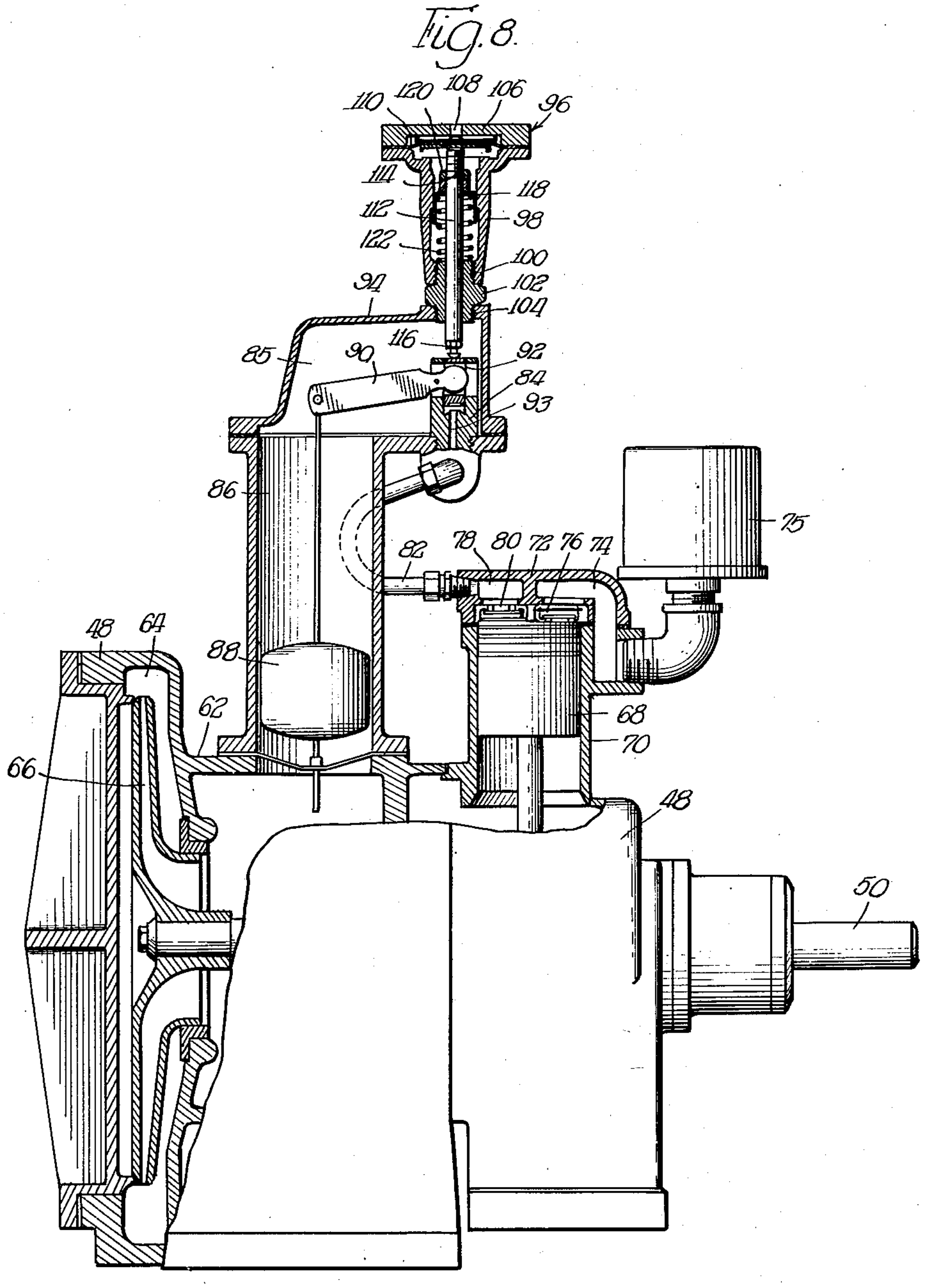
Figure 8 is an enlarged fragmentary sectional elevation through the pump air separator chamber showing the vacuum control valve assembly which limits the vacuum producing capacity of the pump, and particularly limits the vacuum to which the hose is subjected in vacuumizing or defueling.

Referring now, more particularly, to the automatic control construction of Figures 6 and 7, the valve stem or shaft 324 within the cap 320 is provided with the gear 504 fixed to said shaft, said gear meshing with the segment 506 pivoted as at 508 to the bracket 510. Cap 320 is provided with the cylinder housing 512 secured thereto, and segment 506 is provided with segment 514 meshing with circular rack 516 provided on the hollow piston rod 518. Hollow rod 518 is provided with the piston 520 reciprocally mounted in the cylinder 522, the outer end of the cylinder communicating with passage 524 which in turn communicates through the restricted opening 526 with passage 528 which communicates with the pump suction, through passages 529 (Figures 6 and 7), 531 and tube 440 (Figures 1A, 1B and 4). Passage 524 is connected through passage 530 to the outer end of cylinder 532 in which piston 534 is reciprocally mounted, said piston 534 being connected to piston rod 536 slidably mounted in the hollow piston 518, a spring 538 being interposed between the seat 540 on piston 518 and the spring seat 542 provided on piston 534. Passage 530 also communicates through restricted orifice 544 to the pump suction through passages 546 and 528.

Cylinder housing 512 is provided with the valve seat 548 adapted to be closed by the valve 550 controlled between open and closed positions by means of the operating means 552 extending outwardly of the cylinder housing. When manual operation of control valve 316 is desired, rather than automatic operation, valve 550 must be in open position. When in this position the device is readily operated by hand lever 326 (Figures 4 and 1B) independently of the electronic control. When the valve 550 is open the pressures on the outside of both pistons 520 and 534 are equal, thus rendering the pistons inoperative but offering no resistance to shaft 324 being turned, and by means of segments 506 and 514, moving the pistons back and forth. Valve 316 operates automatically if valve 550 is closed, when switch 220 (Figure 1A) is closed. Passage 530 is connected through fitting 554, tube 556, fitting 558 to the passage 560 (Figure 17) below the valve seat 562 of fitting 564 which is associated with the switch box 236. The position of valve 566 in relation to said seat is controlled by means of the solenoid 568 provided on the solenoid valve assembly 570. Passage 572 above seat 562 communicates through fitting 574, tube 576, and fitting 578 (Figure 6) to the cylinder casing between pistons 520 and 534 which, of course, communicates with the operating valve within the cover 320.

Figure 17:
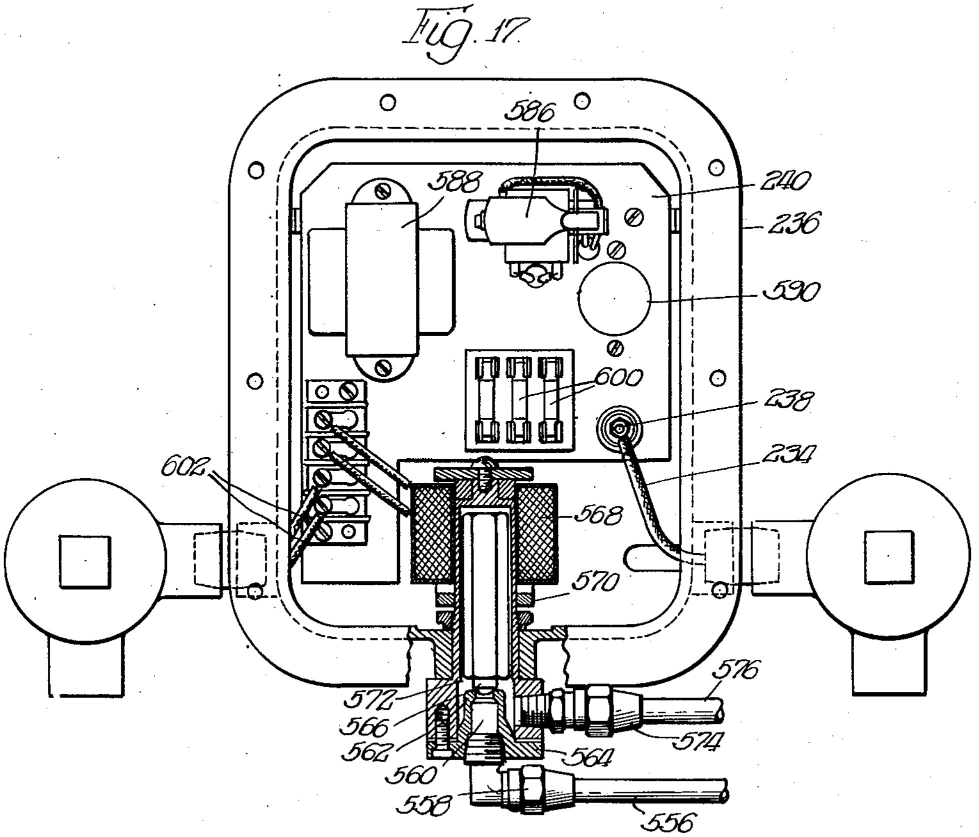
Figure 17 is a sectional elevation through the switch box assembly for the electrically controlled mechanism of the filling mechanism and showing in section the fueling and defueling valve.
Figure 18:
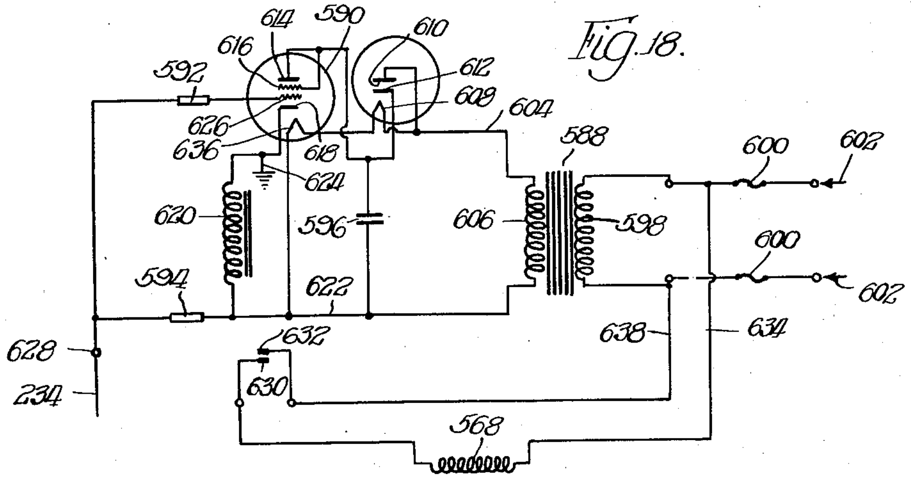
Figure 18 is a wiring diagram of a form of electric control mechanism embodying the invention.

Referring to the hydro-electronic control shown in Figures 17 and 18, the switch box 236 is provided with the electronic mechanism on the control panel 240 to be more particularly described with respect to Figure 18, the said control being for the solenoid valve 570. The control panel 240 includes a relay 586, a transformer 588, a vacuum tube 590, resistors 592 and 594, and condenser 596. The transformer primary 598 is connected to a source of electrical energy, which is here assumed to be alternating current, although direct current could be utilized with only slight modifications, through fuses 600—600 and contacts 602. Application of this electrical energy causes the heaters of the tube 590 to bring the said tube to operating condition, since a closed circuit exists from one end of the transformer secondary 606 through line 604, heater 608, heater 636, and line 622 to the other end of the transformer secondary. During the positive half cycle of the input voltage current flows through line 604 from the transformer secondary 606 to the plate 610, to the cathode 612 and thence to plate 614 and screen 616 and therefrom to cathode 618 and through the coil 620 of relay 586 to line 622 and back to the transformer 588. The cathode 618 is connected to ground at a point 624. The grid 626 is connected to resistor 592, the other side of which is connected to terminal post 628. Also connected to terminal post 628 is one side of resistor 594, the other side of which is connected to line 622. The control lead indicated generally at 234 connects to the static wire herein before mentioned. If the control line 234 is not grounded, a predetermined amount of current will flow through the tube, as indicated above, and through the relay. This amount is insufficient to close the relay contact points 630 and 632. The voltage drop existing across toe coil of relay 586 is such as to apply a suitable negative bias via resistor 594 and control post 628 and resistor 592 to the grid 626 of the tube to maintain such small predetermined current. However, if control post 628 is connected to ground through control line 234, the end of resistor 592 connected thereto is also effectively grounded, which removes the negative bias previously applied to grid 626 and places it substantially at the same potential as the cathode 618, thus permitting a greater amount of current to flow from plate 614 to cathode 618 through the coil 620 of the relay 586, and back to the transformer secondary 606 through line 622. Such greater amount of current is sufficient to cause the relay points 630 and 632 to close, forming a closed circuit between contacts 602 through line 634, coil 568, contact points 630 and 632, and line 638. The closing of this circuit causes current to flow through coil 568 which opens the solenoid valve 570 shown in Figure 17. If the control line 234 is again disconnected from ground, the voltage existing across the coil 620 of relay 586 will again be applied as a bias through resistors 594 and 592 to the grid 626, and act to reduce the current passing from 614 to 618, and through the relay coil 620. This current being insufficient to maintain contacts 630 and 632 closed, they will open so interrupting the circuit to the coil 568 of the valve 570 (Figure 17) which will permit said valve to close and shu off the flow of fluid.

The voltage being applied to plate 610 is here assumed to be alternatively positive and negative. The current will flow from plate 610 to cathode 612 as mentioned above when the plate 610 is positive. During the interval when the voltage at 610 is negative, no current will pass from 610 to 612. However, when the current is flowing from plate 610 to cathode 612, a charge is built up on condenser 596. When the current from 610 to 612 is cut off, condenser 596 will maintain plate 614 at a positive potential during its discharge period, and current will continue to flow from plate 614 to cathode 618. The discharge period of condenser 596 is longer than one-half cycle of the input voltage, so that this discharge will continue during the negative half cycle and current will flow continuously from 614 to 618 even though the plate 610 is negative. Thus the relay 586 will be maintained energized during the negative half cycles of the alternating current and the contacts thereof will not chatter.

Assuming that it is desired to fuel a vehicle, such as a plane, the nozzle coupling 216 (Figure 1) is attached to the coupling 227 of the plane tank, the tank being grounded. Valve 550 (Figure 6) will be closed for automatic operation and the pump motor 60 (Figure 1) will be operating to operate the pump. The control for starting and stopping the pump is separate from that which controls the supply of fuel to the hose. The switch 220 (Figure 1) at the nozzle end may be closed, operating the electronic mechanism on the control panel 240 (Figure 17) as above described, which in turn energizes the solenoid 568 of the solenoid valve assembly 570 to open valve 566. Pump pressure is then communicated from tube 458 (Figures 3 and 1B) to the inside of the cap 320 and from thence to the cylinder casing between pistons 520 and 534 (Figure 6) through fitting 578, tube 576, valve seat 562, and tube 556 to passage 530, thereby communicating pump pressure to the outside of piston 534 in the space between piston 534 and cap 535. Piston 534 will move, causing the rack 516 to move the segment 514 around pivot 508, thereby moving segment 506 downwardly as viewed in Figure 6. Segment 506 will move gear 504 to rotate the valve disk 432 to the position as illustrated in Figure 1B.

The pump suction will cause liquid from the source of supply to be drawn through pipe 20 (Figure 1A) and past valve 28, said valve having been opened by pump suction inasmuch as the pressure above and below the piston 36 is equalized as tube 450 is connected through passages 446, 444, 436 and tube 440 (Figures 1A and 1B) to the pump suction. Liquid will pass through the meter 126 but will not at this time cause registration as it is assumed that the hose 214 is in a collapsed empty condition, and therefore, as yet the meter shaft will not have been operatively connected to the operating shaft of the register.

Up to this time valve 186 (Figure 1B) will have been closed, but liquid under pump pressure will pass through tube 458, passages 480 and 472, and tube 476 to the underside of piston 198 which will open said valve 186 due to the difference in area between the valve and piston, the piston area being always greater than the valve area. Valve 288 will at this time be held closed as pump pressure will be supplied through passages 482 and 484, and tube 488 to the underside of piston 296, and also pump pressure will be supplied to the underside of valve 288.

Figures 11, 12:
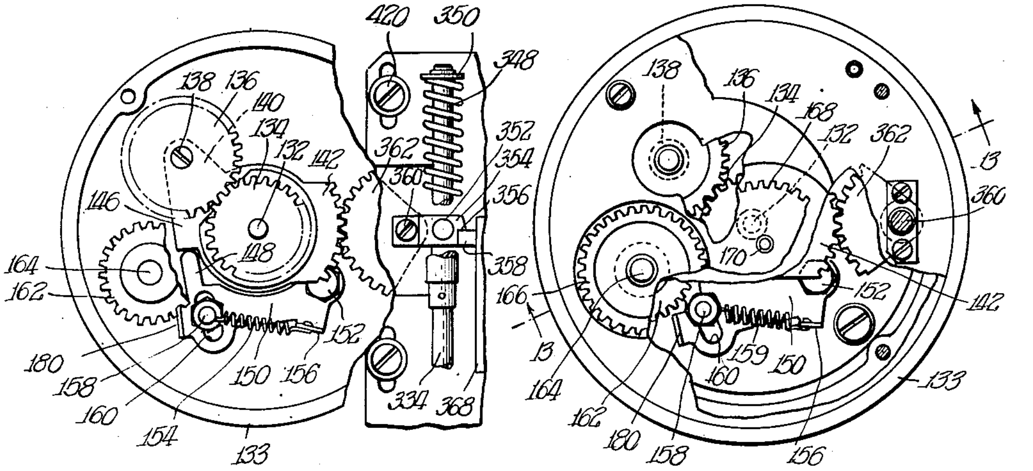
Figure 11 is a fragmentary sectional plan view taken substantially in the plane as indicated by the line 11—11 of Figure 9, showing the disengaging mechanism and locking means therefor.
Figure 12 is a fragmentary top plan view taken substantially in the plane as indicated by the line 12—12 of Figure 9, showing the gearing for driving the registering mechanism and disengaging mechanism.

Pump suction will be communicated through tube 440, passages 436, 434, and 428, and tube 424 to the cylinder 628 (Figure 1A) above piston 266 which will equalize the suction below piston 266, so therefore the valves 258 and 276 will be closed so that there is no communication between the pump suction and the hose 214. Liquid will then pass through housing 200, pipe 206, to the hose 214 and will operate the hose valve and tank fitting valve as described in said application Serial No. 655,953. Just prior to the time that the hose pressure is built up to a point to operate the coupling and tank valves, i. e., at the time the hose is completely filled with liquid, hose pressure will be supplied through fitting 382 (Figure 1B) and tube 380 to passage 376 (Figure 15), causing the bellows 370 to elongate, thereby moving the stop pin 358 flush with the bracket 368 to move said pin 358 out of engagement with the lug 356 (Figure 11).

When the shaft 324 (Figures 6, 7 and 1B) was moving to "serve" position, as above described, the cam 328 will have been shifted to move the clutch rod 334 (through cam passage 336 (Figure 3)) compressing spring 348 inasmuch as at that time the pin 358 will not have been moved to disengage the lug 356. After disengagement the spring will permit the block 338 (Figures 9 and 10) to rotate on the shaft 360 (Figures 9, 10 and 11) causing segment 362 to rotate gear segment 142 in a counterclockwise direction to move the gear 136 into mesh with gear 162. As the segment 142 moves to mesh said gears, the locking shoulder 180 of the pawl 150 will have been moved out of engagement with gear 162. Thus the meter shaft 128 will be connected to the register shaft 170 through gears 134, 136, 162, 166 and 168 (Figures 11 and 12) so that thereafter passage of liquid through the meter will cause registering by the register 172 (Figure 10).

Should the ground be broken at any time or should the switch at the nozzle be opened at any time, the electronic mechanism on the control panel 240 (Figure 17) will operate as above described to cause the solenoid 568 to release valve 566, permitting it to close by gravity, thereby closing passage 560. This then will close communication between tubes 576 and 556 whereby the pump suction communicating with passage 546 acts on piston 534 (Figure 6). As there is vacuum also in passage 524, the piston 534 will tend to move away from piston 520 whereupon port 580 in piston rod 536 will open into the cylinder housing 512 between pistons 520 and 534, and liquid will flow through port 580 and passages 582 and 584 into cylinder 522, thereby supplying pump pressure to the cylinder 522 on the opposite side of the piston from the piston rod 518 whereby the pressure on the piston 520 on said side will be equal to the pressure on the other side of the piston except for the amount necessary to compress the spring 538. Pressure then on the piston 534 on the piston rod side of said piston, together with vacuum on the other side of said piston will move the piston assembly toward the side of the cylinder 532 opposite to that of the piston rod, thereby shifting the segments 514 and 506 to rotate the gear 504 toward inoperative position causing the valve disk 432 to move to the position illustrated in Figure 2. Movement of the shaft 324 to inoperative position will in turn move the cam 328 (Figure 3) to inoperative position, moving the clutch rod 334 which in turn rotates segments 362 and 142 (Figure 11, etc.) to move the arm 140 to disengage gear 136 from gear 162, thereby disengaging the meter shaft 128 from the register shaft 170 and locking gear 162 by engagement of the lug 180 therewith.

Valve 28 (Figure 1A) will be closed as the pump pressure will be communicated through tube 458 through passage 454 and tube 450 to the cylinder 38 above the piston 36. Since valve 28 is closed the pump suction will be communicated to the underside of piston 266. The suction below piston 266 will open hose suction valve 276 inasmuch as the suction below the piston is greater than the suction above the piston as the cylinder 268 above the piston is connected through fitting 422, tube 424, passages 428, 502, 500, tube 496, manifold 304, pipe 308 (Figure 1B) to the source of supply which is a low suction. When the hose suction valve 276 opens, the excessive hose pressures are released and further downward movement of the piston 266 is permitted, opening the valve 258, whereby suction from the pump is communicated to the hose, valve 250 being merely a check valve.

Valve 186 (Figure 1B) is closed inasmuch as the pressure above and below piston 198 will equalize when the portion of cylinder 200 below the piston is connected through tube 476, passages 472 and 470, tube 464, to the housing 210 (Figure 1A) which communicates with the cylinder 200 (Figure 1B) above the piston 198, permitting the spring 188 to close the valve 186. The valve 186 is closed as just described to allow the hose to be vacuumized, since if it remained open pump pressure, as well as pump suction would be communicated to the hose.

Valve 186 remains closed due to the force exerted by spring 188 when valve disk 432 has been moved to the position shown in Figure 2, even though the pump is inoperative. Valve disk 250 will also remain closed in such a case. These two valves, therefore, maintain the hose in collapsed condition, even though the pump is inoperative, as long as valve disk 432 remains in the position shown in Figure 2. Valve 288 is open since pump suction is communicated to the underside of piston 296 through tube 488, passages 484, 492, 436 and tube 440. The area of the piston 296 being greater than that of the valve 288, the force exerted on piston 296 by pump pressure is greater than the force exerted on valve 288 by pump pressure, which causes the valve to open. Liquid from the hose then is returned through the pump, past valve 288 and through pipes 308 and 20 to the source of supply.

The pressure drop in the hose permits the pressure within the sylphon to be reduced whereby the spring 398 moves the cover 384 toward the sylphon supporting bracket whereupon pin 358 is moved into latched engaging position to lug 356 locking the register out of engagement with the meter shaft.

Thus in the system disclosed a fuel dispensing apparatus is provided which permits high speed delivery of fuel at a relatively low pressure through a flexible, collapsible hose, which may be easily handled or stored between dispensing operations, since during that time it is normally in an exhausted, collapsed condition. This feature and the nozzle end control permits operation of the apparatus by one attendant, since such dispensing and evacuating operations may be controlled from the nozzle end of the dispensing hose.

It is to be understood that we do not wish to be limited by the exact embodiments of the device shown, which are merely by way of illustration and not limitation, as various and other forms of the device will, of course, be apparent to those skilled in the art without departing from the spirit of the invention or the scope of the claims.

We claim:

1. In liquid dispensing apparatus, the combination of a flexible, collapsible hose, valve mechanism normally closing the hose at its dispensing end and maintaining it in an exhausted, collapsed condition, means for pumping liquid into said hose at will, the valve mechanism opening the dispensing end of said hose when the pressure of said liquid pumped into said hose has risen above a predetermined point, means for measuring the amount of liquid dispensed from said hose after the pressure within said hose is at or above said predetermined point, means for registering the amount of liquid dispensed from said hose, pressure controlled means for rendering said last named means operative to register when the pressure within the hose is at or above said predetermined point, and means for pumping liquid within said hose back out of said hose at will, thereby reducing the pressure of said liquid in said hose, causing said dispensing end to close, and thereby returning said hose to exhausted, collapsed condition.

2. In liquid dispensing apparatus, the combination of a liquid flow line, a flexible, collapsible hose, valve mechanism normally closing the hose at its dispensing end and maintaining it in an exhausted, collapsed condition, means for pumping liquid through said liquid flow line into said hose at will, the valve mechanism opening the dispensing end of said hose when the pressure of said liquid pumped into said hose has risen above a predetermined point, a meter in said liquid flow line for measuring the amount of liquid dispensed from said hose, a register adapted to be operated by said meter for registering the amount of liquid dispensed from said hose, pressure controlled means for controlling the connecting and disconnecting of said register from said meter, and means for pumping liquid within said hose back out of said hose into said liquid flow line at will, thereby reducing the pressure of said liquid in said hose, causing said dispensing end to close, and thereby returning said hose to exhausted, collapsed condition.

3. In liquid dispensing apparatus, the combination of a liquid flow line, liquid forcing means for forcing liquid through said line, delivery means for dispensing liquid from the outlet side of said liquid flow line during a dispensing operation, said delivery means comprising a flexible, collapsible hose, means for closing the dispensing end of said hose when the pressure within said hose drops below a predetermined point, means for withdrawing liquid remaining in said hose after a dispensing operation through the inlet end of said hose and leaving said hose in a collapsed condition until a new dispensing operation is begun, an outlet flow line adapted to divert the flow of said liquid at the outlet side of said liquid forcing means when said liquid is being removed from said hose after a dispensing operation, means for placing said apparatus in dispensing or non-dispensing condition at will, control means for making said liquid forcing means operative and inoperative at will, means for registering the amount of liquid flowing out of said dispensing end of said hose, and means operable upon initiating withdrawal from the hose for rendering said last named means inoperative.

4. In liquid dispensing apparatus, the combination of a liquid flow line, liquid forcing means for forcing liquid through said line, delivery means for dispensing liquid supplied through said flow line, said delivery means comprising a flexible, collapsible hose adapted to be dry and collapsed when the apparatus is in normal inoperative condition, means for closing the delivery end of the hose, means for removing the liquid from said hose after a dispensing operation and after closing the delivery end of the hose by reducing the pressure in said flow line at the inlet end of said hose after the delivery end of the hose is closed, thereby exhausting the liquid from the hose and returning said hose to its normal inoperative condition wherein it is collapsed and dry, a metering device in said liquid flow line, a register adapted to be operated by said metering device when liquid is being dispensed from the delivery end of said hose, and means responsive to hose pressure for disconnecting said register from the metering device when the hose pressure is reduced a predetermined amount.

5. In a liquid dispensing apparatus, the combination of a liquid flow line comprising an inlet flow line, a flexible, collapsible dispensing flow line, and an outlet flow line, liquid forcing means for drawing liquid into said inlet flow line and forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation comprising a plurality of pressure operated control means subjected to flow line pressure for controlling the flow of liquid in said inlet flow line, for controlling the communication of said dispensing flow line with the inlet and outlet sides of said liquid forcing means, and for diverting the flow of said liquid at the outlet side of said liquid forcing means into said outlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, a pressure distribution means for controlling the pressure applied to said plurality of pressure operated control means, and means for registering the amount of liquid flowing out of said dispensing end of said hose.

6. In a liquid dispensing apparatus, the combination of a liquid flow line comprising an inlet flow line, a flexible, collapsible dispensing flow line, and an outlet flow line, liquid forcing means for creating suction for drawing liquid into said inlet flow line and for forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation comprising a plurality of valves having pressure operated control cylinders subjected to flow line pressure and forcing means suction for controlling the flow of liquid in said inlet flow line, for controlling the communication of said dispensing flow line with the inlet and outlet sides of said liquid forcing means, and for diverting the flow of said liquid at the outlet side of said liquid forcing means into said outlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, a pressure distribution means for controlling the pressure applied to said plurality of pressure operated control means, a metering device in said liquid flow line, a register adapted to be operated by said meter when said hose has been filled with liquid, means for interrupting the operation of said register by said metering device when said means for removing said liquid from said hose becomes operative at the conclusion of a dispensing operation, said register therefor registering only the amount of liquid flowing out of said dispensing end of said hose during a dispensing operation.

7. In a liquid dispensing apparatus, the combination of a liquid flow line comprising an inlet flow line, a flexible, collapsible dispensing flow line, and an outlet flow line, liquid forcing means for creating suction for drawing liquid into said inlet flow line and for forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation comprising a plurality of valves having pressure operated control cylinders subjected to flow line pressure and forcing means suction for controlling the flow of liquid in said inlet flow line, for controlling the communication of said dispensing flow line with the inlet and outlet sides of said liquid forcing means, and for diverting the flow of said liquid at the outlet side of said liquid forcing means into said outlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into said inlet side of said liquid forcing means, and also causing said dispensing flow line to collapse as said liquid is forced out, means for maintaining said reduced pressure within said dispensing flow line until a new dispensing operation is begun, a pressure distribution means for controlling the pressure applied to said plurality of pressure operated control means, two additional manually operated control means operative at will, said last named two control means controlling the operation of said pressure distribution means, a metering device in said liquid flow line, a register adapted to be operated by said meter when said hose has been filled with liquid, means for interrupting the operation of said register by said metering device when said means for removing said liquid from said hose becomes operative at the conclusion of a dispensing operation, said register therefor registering only the amount of liquid flowing out of said dispensing end of said hose during a dispensing operation.

8. In a liquid dispensing apparatus, the combination of a liquid flow line comprising an inlet flow line, a flexible, collapsible dispensing flow line, and an outlet flow line, liquid forcing means for drawing liquid into said inlet flow line and forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation comprising a first pressure operated control means for controlling the flow of liquid out of said inlet flow line into said liquid forcing means, a second pressure operated control means for controlling the flow of liquid into said dispensing flow line, a third pressure operated control means for controlling the flow of said liquid out of said dispensing flow line at the inlet end of said line, a fourth pressure operated control means for diverting the flow of said liquid at the outlet side of said liquid forcing means into said inlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, a pressure distribution means for controlling the pressure applied to said plurality of pressure operated control means, manually operated control means for making either of two additional manually operated control means operative at will, said last named two control means controlling the operation of said pressure distribution means, a metering device in said liquid flow line, a register adapted to be operated by said meter when said hose has been filled with liquid, means for interrupting the operation of said register by said metering device when said means for removing said liquid from said hose becomes operative at the conclusion of a dispensing operation, said register therefor registering only the amount of liquid flowing out of said dispensing end of said hose during a dispensing operation.

9. In a liquid dispensing apparatus, the combination of a liquid flow line comprising an inlet flow line, a flexible, collapsible dispensing flow line, and an outlet flow line, liquid forcing means for drawing liquid into said inlet flow line and forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation, said several means comprising a plurality of pressure operated control means comprising a valve for controlling the flow of liquid in said inlet flow line, separate valves for controlling the communication of said dispensing flow line with the inlet and outlet sides of said liquid forcing means, and a valve for diverting the flow of said liquid at the outlet side of said liquid forcing means into said inlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, manually operated control means for controlling an electrically operated pressure control valve, a fifth pressure operated control means operated by said control valve, a pressure distribution means operated by said fifth pressure operated control means, said pressure distribution means controlling the pressure applied to said first named, second, third and fourth pressure operated control means, a metering device in said liquid flow line, a register adapted to be operated by said meter when said dispensing flow line has been filled with liquid, means for interrupting the operation of said register by said metering device when said means for removing said liquid from said dispensing flow line becomes operative at the conclusion of a dispensing operation, said register therefor registering only the amount of liquid flowing out of said dispensing end of said dispensing flow line during a dispensing operation.

10. In a liquid dispensing apparatus, the combination of a liquid flow line comprising an inlet flow line, a flexible, collapsible dispensing flow line, and an outlet flow line, liquid forcing means for drawing liquid into said inlet flow line and forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation, said several means comprising a plurality of pressure operated control means comprising a valve for controlling the flow of liquid in said inlet flow line, separate valves for controlling the communication of said dispensing flow line with the inlet and outlet sides of said liquid forcing means, and a valve for diverting the flow of said liquid at the outlet side of said liquid forcing means into said inlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, manually operated control means for controlling an electrically operated pressure control valve, a fifth pressure operated control means operated by said control valve, a pressure distribution means operated by said fifth pressure operated control means, said pressure distribution means controlling the pressure applied to first named, second, third and fourth pressure operated control means, a metering device in said liquid flow line, a register adapted to be engaged by said metering device, the engagement of said register being controlled by the movements of said pressure distribution means, and a sixth pressure operated control means adapted to keep said register out of engagement with said metering device irrespective of the movements of said pressure distribution means until a predetermined pressure has been reached in said dispensing flow line.

11. In a liquid dispensing apparatus, the combination of a liquid flow line comprising an inlet flow line, a flexible, collapsible dispensing flow line, and an outlet flow line, liquid forcing means for drawing liquid into said inlet flow line and forcing said liquid out through said dispensing flow line during a dispensing operation, control means for making said liquid forcing means operative and inoperative at will, means for closing the dispensing end of said dispensing flow line when the pressure within said dispensing flow line drops below a predetermined point, means for removing the liquid from said dispensing flow line at the conclusion of a dispensing operation comprising a plurality of pressure operated control means for controlling the flow of liquid in said inlet flow line, for controlling the communication of said dispensing flow line with the inlet and outlet sides of said liquid forcing means, and for diverting the flow of said liquid at the outlet side of said liquid forcing means into said outlet flow line when liquid is being removed from said dispensing flow line at the conclusion of a dispensing operation, and means for reducing the pressure within said liquid flow line at the inlet side of said liquid forcing means to a point below atmospheric pressure, said reduced pressure, when said inlet end of said dispensing flow line is in communication with said inlet side of said liquid forcing means, causing said closing means to close said dispensing end of said dispensing flow line, also causing said liquid to be forced out of said dispensing flow line into association with said inlet side of said liquid forcing means, and also causing said dispensing flow line to collapse as said liquid is forced out, means for maintaining said reduced pressure within said dispensing flow line until a new dispensing operation is begun, a manually operated control means for controlling an electrically operated pressure control valve, a fifth pressure operated control means operated by said control valve, a pressure distribution means operated by said fifth pressure operated control means, said pressure distribution means controlling the pressure applied to said first named, second, third and fourth pressure operated control means, a metering device in said liquid flow line, a register adapted to be engaged by said metering device, the engagement of said register being controlled by the movements of said pressure distribution means, and a sixth pressure operated control means adapted to keep said register out of engagement with said metering device irrespective of the movements of said pressure distribution means until a predetermined pressure has been reached in said dispensing flow line, a second manually operated control means for making said fifth pressure operated control means inoperative at will, and a third manually operated control means for operating said pressure distribution means when said fifth pressure operated control means is inoperative.

12. In liquid dispensing apparatus of the character described having a dispensing hose, the combination of a vacuum tube having a control grid, a manually operated control means associated with the dispensing end of the hose, said control means being adapted to decrease at will the negative bias on the control grid of a vacuum tube whereby current flowing through said vacuum tube is increased, an electromagnetic relay adapted to be energized by said current flowing through said vacuum tube, said relay being normally urged to open position but adapted to be closed by said increase in said current, a solenoid adapted to be energized by the closing of said relay, a pressure control valve, said solenoid being adapted to control the operation of said pressure control valve, said pressure control valve in turn controlling the operation of said liquid dispensing apparatus.

13. In liquid dispensing apparatus of the character described, the combination of a manually operated control means, an electrically operated pressure control valve adapted to be controlled by said manually operated control means, pressure operated control means controlled by said pressure control valve, pressure distribution means controlled by said pressure operated control means, additional pressure operated control means controlled by said pressure distribution means, said additional pressure operated control means comprising a plurality of independently operable valves controlling the flow of liquid in said dispensing apparatus, and means for registering the amount of liquid dispensed by said apparatus, said last named means also being controlled by said additional pressure operated control means.

SHERWOOD HINDS.
J. GORDON DAHLEM.

REFERENCES CITED

The following references are of record in the file of this patent:

UNITED STATES PATENTS

| Number | Name | Date |
|---|---|---|
| 1,607,899 | Long | Nov. 23, 1926 |
| 1,722,985 | Kling | July 30, 1929 |
| 2,017,345 | Granberg | Oct. 15, 1935 |
| 2,035,083 | Mattern | Mar. 24, 1936 |
| 2,188,849 | Sevenson | Jan. 30, 1940 |
| 2,362,569 | Jauch et al. | Nov. 14, 1944 |

FOREIGN PATENTS

| Number | Country | Date |
|---|---|---|
| 743,171 | France | Jan. 6, 1933 |